United States Patent
Turvy, Jr. et al.

(10) Patent No.: US 7,108,187 B2
(45) Date of Patent: Sep. 19, 2006

(54) METHOD OF READING A PLURALITY OF BAR CODES DURING A SCANNING MOTION

(75) Inventors: Larry D. Turvy, Jr., Lawrenceville, GA (US); Theodore Heske, III, Suwanee, GA (US)

(73) Assignee: NCR Corporation, Dayton, OH (US)

( * ) Notice: Subject to any disclaimer, the term of this patent is extended or adjusted under 35 U.S.C. 154(b) by 211 days.

(21) Appl. No.: 10/704,888

(22) Filed: Nov. 10, 2003

(65) Prior Publication Data

US 2005/0098632 A1    May 12, 2005

(51) Int. Cl.
    *G06K 5/04* (2006.01)
(52) U.S. Cl. .............................. 235/462.08; 235/462.18
(58) Field of Classification Search ........... 235/462.01, 235/462.08, 462.09, 462.12, 462.18
    See application file for complete search history.

(56) References Cited

U.S. PATENT DOCUMENTS

| | | | |
|---|---|---|---|
| 5,237,163 A * | 8/1993 | Collins et al. ......... 235/462.25 |
| 5,262,623 A * | 11/1993 | Batterman et al. .......... 235/454 |
| 5,296,691 A | 3/1994 | Waldron et al. |
| 5,304,787 A * | 4/1994 | Wang .................... 235/462.09 |
| 5,436,439 A * | 7/1995 | Nishimura et al. ..... 235/462.14 |
| 5,512,739 A * | 4/1996 | Chandler et al. ...... 235/462.09 |
| 5,773,806 A * | 6/1998 | Longacre, Jr. ........... 235/462.1 |
| 5,831,674 A * | 11/1998 | Ju et al. ..................... 348/302 |
| 6,371,371 B1 * | 4/2002 | Reichenbach ............... 235/454 |
| 6,565,004 B1 * | 5/2003 | Ishii et al. ............. 235/462.25 |
| 6,729,544 B1 * | 5/2004 | Navon .................... 235/462.14 |
| 6,739,513 B1 * | 5/2004 | McClellan et al. .... 235/462.14 |
| 6,749,110 B1 * | 6/2004 | Hecht .................... 235/462.22 |
| 2002/0008141 A1 | 1/2002 | Ishii et al. |

\* cited by examiner

*Primary Examiner*—Ahshik Kim
(74) *Attorney, Agent, or Firm*—Paul W. Martin; Priest & Goldstein, PLLC

(57) ABSTRACT

A method of reading a plurality of bar codes during a scanning motion across a bar code scanner which enhances scanner operation. The method includes the steps of obtaining data from a detector in the bar code scanner, determining position information associated with the data, distinguishing data associated with each bar code using the position information, and assembling the bar codes from the data.

11 Claims, 4 Drawing Sheets

METHOD OF READING A PLURALITY OF BAR CODES DURING A SCANNING MOTION

BACKGROUND OF THE INVENTION

The present invention relates to optical scanners and more specifically to a method of reading a plurality of bar codes during a scanning motion.

The typical bar code scanner scans one item at a time. If two (or more) items are presented to the scanner simultaneously, the scanner will recognize only one of the bar codes.

Therefore, it would be desirable to provide a method of reading a plurality of bar codes during a scanning motion.

SUMMARY OF THE INVENTION

In accordance with the teachings of the present invention, a method of reading a plurality of bar codes during a scanning motion is provided.

The method includes the steps of obtaining data from a detector in the bar code scanner, determining position information associated with the data, distinguishing data associated with each bar code using the position information, and assembling the bar codes from the data.

It is accordingly an object of the present invention to provide a method of reading a plurality of bar codes during a scanning motion.

It is another object of the present invention to provide a method of reading bar codes on multiple items placed substantially simultaneous within a scan volume, as opposed to being conventionally placed one item at a time within the scan volume.

BRIEF DESCRIPTION OF THE DRAWINGS

Additional benefits and advantages of the present invention will become apparent to those skilled in the art to which this invention relates from the subsequent description of the preferred embodiments and the appended claims, taken in conjunction with the accompanying drawings, in which:

DETAILED DESCRIPTION OF THE PREFERRED EMBODIMENT

Figure 1:
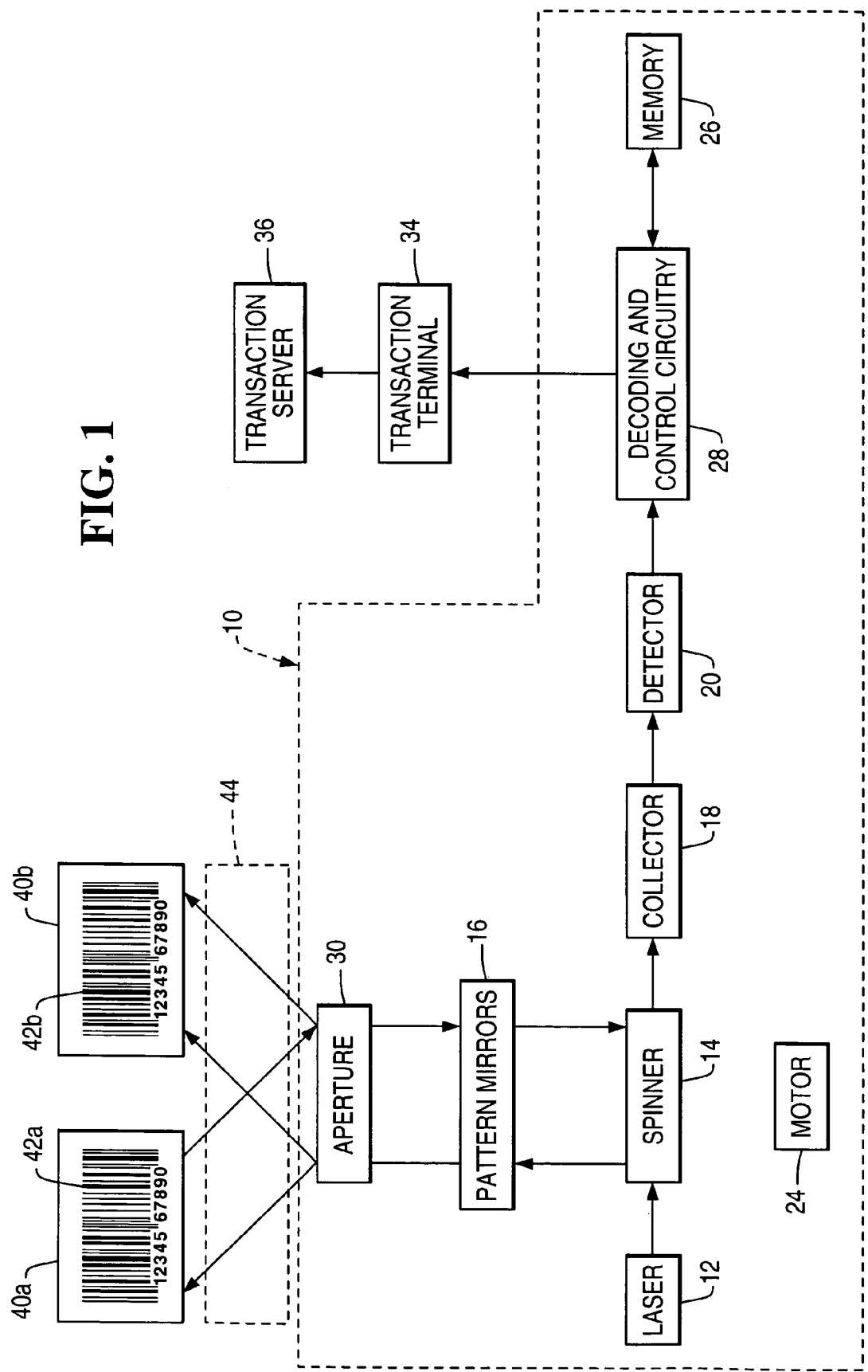
FIG. 1 is a block diagram of a transaction system including an optical scanner.

Turning now to FIG. 1, an example optical scanner 10 includes laser 12, spinner 14, pattern mirrors 16, collector 18, detector 20, memory 26, and decoding and control circuitry 28.

Laser 12 generates a laser beam for scanning bar codes 42a and 42b on items 40a and 40b.

Spinner 14 sweeps the laser beam across pattern mirrors 16. Spinner 14 also receives light reflected from items 40a and 40b and directs the collected light towards collector 18. Spinner 14 may include a polygon spinner having mirrored facets of different angles. Motor 24 rotates spinner 14.

Pattern mirrors 16 direct the laser beam to produce a scan volume 44 defined by the scanning light beams. The position and orientation of pattern mirrors 16 determine the directions of the scanning light beams. If items 40a and 40b are within scan volume 44, scanner 10 may read them.

Collector 18 collects light reflected from items 40a and 40b.

Detector 20 converts the collected light into electrical signals based upon the intensity of the collected light.

Memory 26 stores bar code data and bar code position and direction data.

Decoding and control circuitry 28 controls operation of scanner 10 and decodes bar code information from the electrical signals provided by detector 20. Decoding and control circuitry 28 formats bar code data into a format usable by transaction terminal 34.

Transaction terminal 34 uses the formatted bar code data to determine prices of scanned items 40a and 40b from transaction server 36.

Scanner 10 may include one or more apertures 30 directing scanning light beams at items 40a and 40b from multiple directions. Aperture 30 preferably surrounds a window.

Figure 2A:
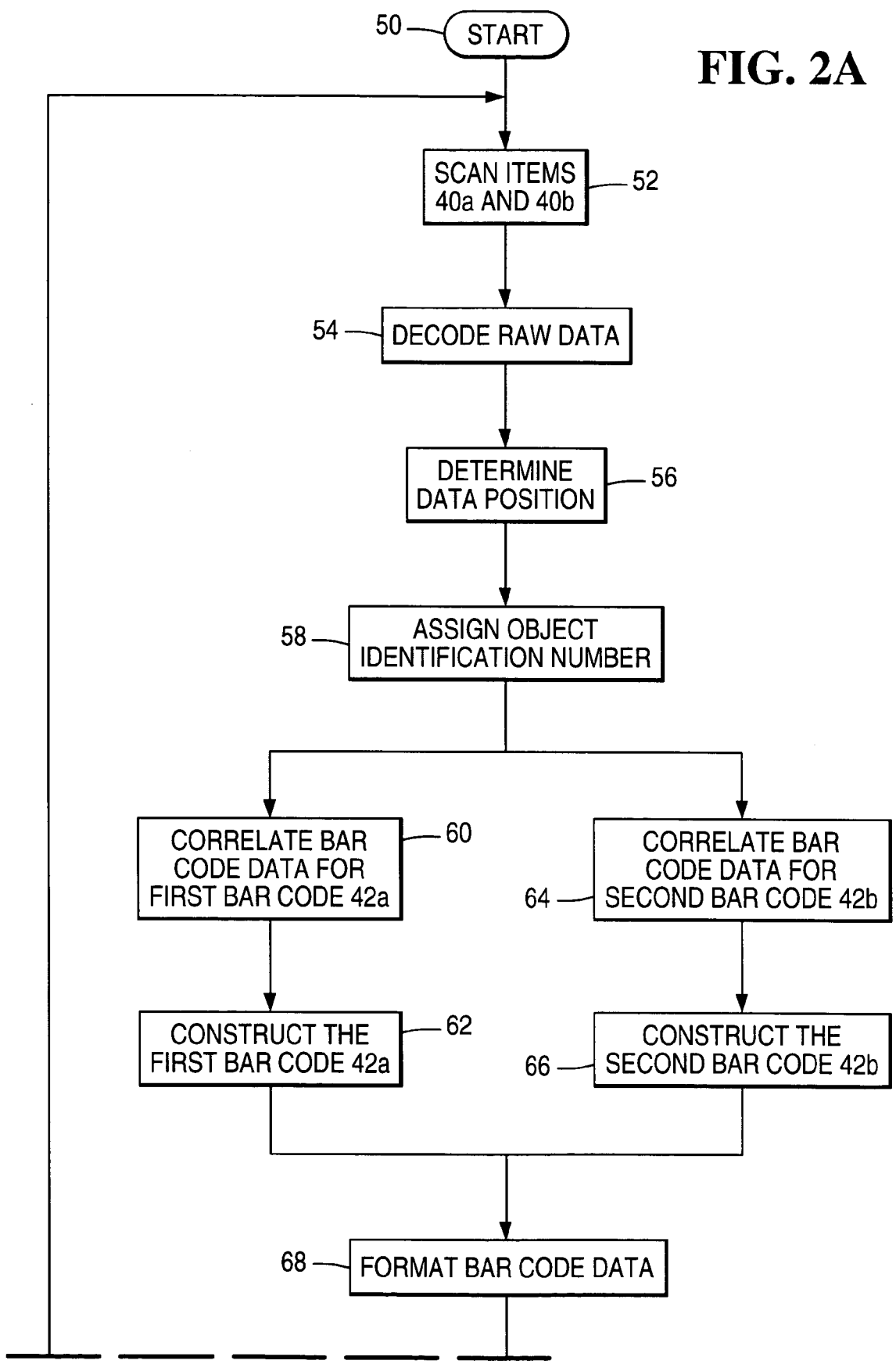
FIGS. 2A and 2B (collectively FIG. 2) are flow diagrams illustrating a preferred method of reading more than one bar code.
Figure 2B:
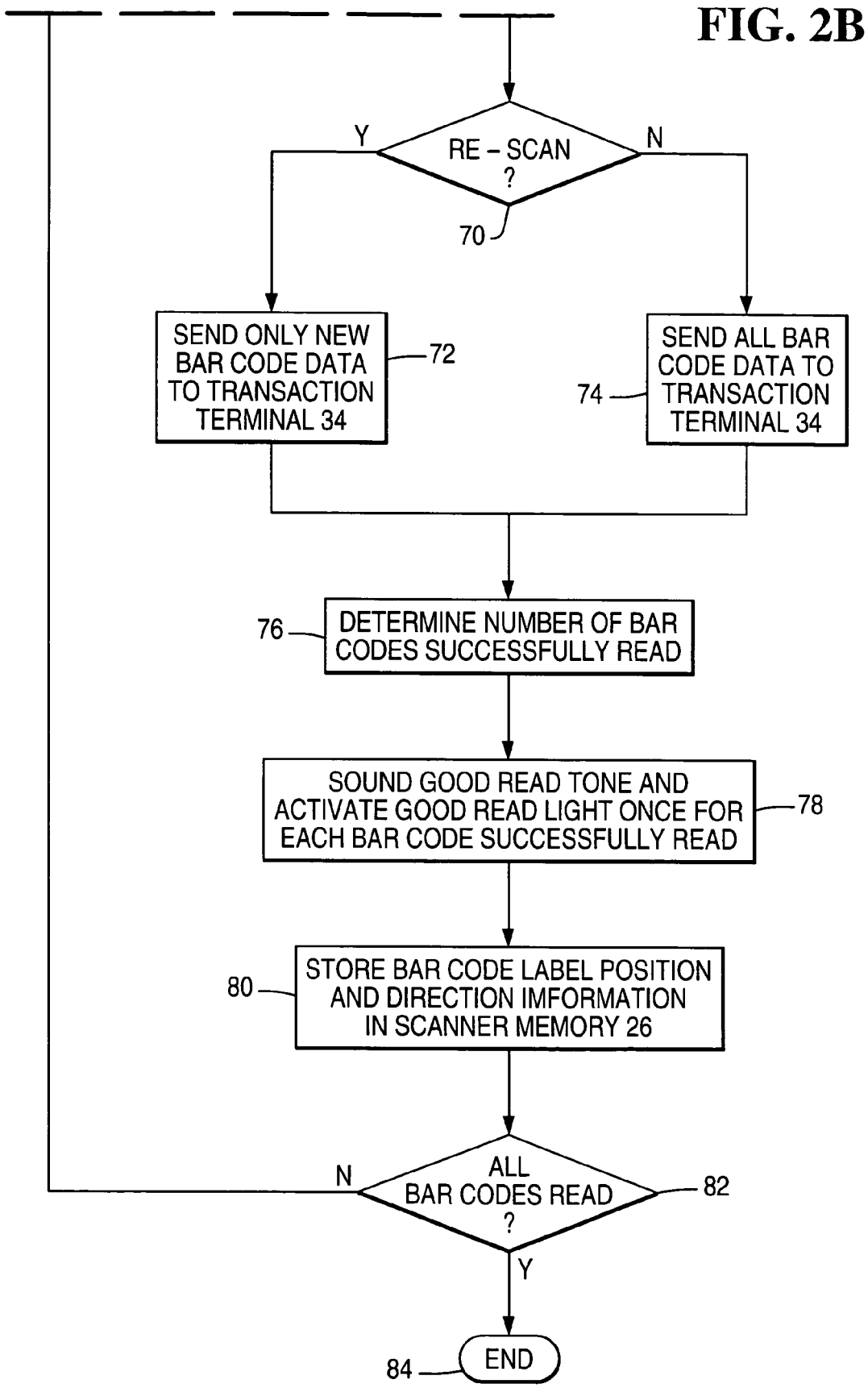

Referring now to FIG. 2, a preferred method of reading more than one bar code begins with Start 50.

In step 52, two items 40a and 40b are placed within scan volume 44. Placement is substantially simultaneous, within scan volume 44, as opposed to conventionally placing one item at a time within scan volume 44.

In step 54, decoding and control circuitry 28 decodes raw data provided by detector 20.

In step 56, decoding and control circuitry 28 determines data positions in scan volume 44 using the techniques identified in commonly assigned U.S. Pat. No. 6,220,513. This patent is hereby incorporated by reference.

These techniques allow decoding and control circuitry 28 to distinguish bar codes of multiple items, including identical bar codes on like items. If two bar codes are present, decoding and control circuitry 28 spatially tracks each bar code 42a and 42b through scan volume 44. Decoding and control circuitry 28 assigns each piece of acquired bar code data a time and location. Upon accumulation of many data segments, decoding and control circuitry 28 computes a trajectory or direction from the corresponding time and location information. Decoding and control circuitry 28 also determines how many bar codes are present in scan volume 44.

In step 58, decoding and control circuitry 28 assigns object identifiers to each piece of bar code data identified in step 56. In the case of two detected data objects, decoding and control circuitry 28 assigns two object identifiers.

Decoding and control circuitry 28 uses correlation routines to process the identified objects in parallel, assemble the bar codes and transmit the assembled bar codes to transaction terminal 34. The correlation routines accept individual pieces of bar code data, e.g., a half bar code, or a partial bar code (something less than a half of a bar code), and use a set of rules to determine when enough data has been accumulated to analyze the accumulated data. When enough data has been accumulated, the correlation routines analyze the data, character-by-character, to construct the bar code. After the correlation routines construct the bar code, the correlation routines perform various tests to determine if the constructed bar code is a valid or invalid bar code.

The object identifiers minimize cross coupling of bar codes, where cross coupling results from combining half of one bar code with half of another bar code. Bar codes of types UPC-A, EAN-13, and EAN-8 are comprised of two halves, separated by a center band character. Proper linkage is achieved when the raw data contains characters from the left half of a bar code, the center band, and characters from the right half of the bar code, all of which must be contiguous. Looking for linkage in the raw data, and using it as an integrity test on constructed bar codes eliminates cross coupling of bar code halves.

In step 60, decoding and control circuitry 28 correlates label data for bar code 42*a*.

In step 62, decoding and control circuitry 28 constructs bar code 42*a*.

In step 64, decoding and control circuitry 28 correlates label data for bar code 42*b*.

In step 66, decoding and control circuitry 28 constructs bar code 42*b*.

In step 68, decoding and control circuitry 28 formats each constructed bar code into a format that terminal 34 may use. Scanner 10 includes a large number of programming options to accomplish this task.

One important feature of the invention is what the scanner does if either or both of bar codes 42*a* and 42*b* is not read on the first attempt. If position and direction information indicates that both bar codes 42*a* and 42*b* are present, decoding and control circuitry 28 postpones generation of a good read indication. After failing to receive a good read indication, an operator rescans both items 40*a* and 40*b*. Decoding and control circuitry 28 processes all bar codes that are present, and sends only those bar codes that are newly decoded to transaction terminal 34.

In step 70, decoding and control circuitry 28 determines whether a re-scan has occurred by comparing position and direction information stored in memory 26 with newly acquired position and direction information. If the stored position and direction information is similar to some or all of the newly acquired position and direction information, then a re-scan has occurred. A re-scan may involve movement of items 40*a* and 40*b* through scan volume 44 in an opposite direction to the initial scanning motion. Operation proceeds to step 72. Otherwise, operation proceeds to step 74.

In step 72, decoding and control circuitry 28 sends only new the formatted label data to transaction terminal 34. Operation proceeds to step 76.

In step 74, decoding and control circuitry 28 sends all formatted label data to transaction terminal 34. Operation proceeds to step 76.

In step 76, decoding and control circuitry 28 determines the number of bar codes successfully read.

In step 78, decoding and control circuitry 28 sounds a good read tone and activates a good read light once for each successfully read bar code.

In step 80, decoding and control circuitry 28 stores bar code position information in memory 26 to prepare for a possible rescan.

In step 82, the checker determines whether all bar codes have been read by comparing the number of scanned items to the number of good read indications. If a rescan is necessary, operation returns to step 52. Otherwise, operation ends at step 84.

Advantageously, the method may be easily expanded to three or more bar codes.

Figure 3:
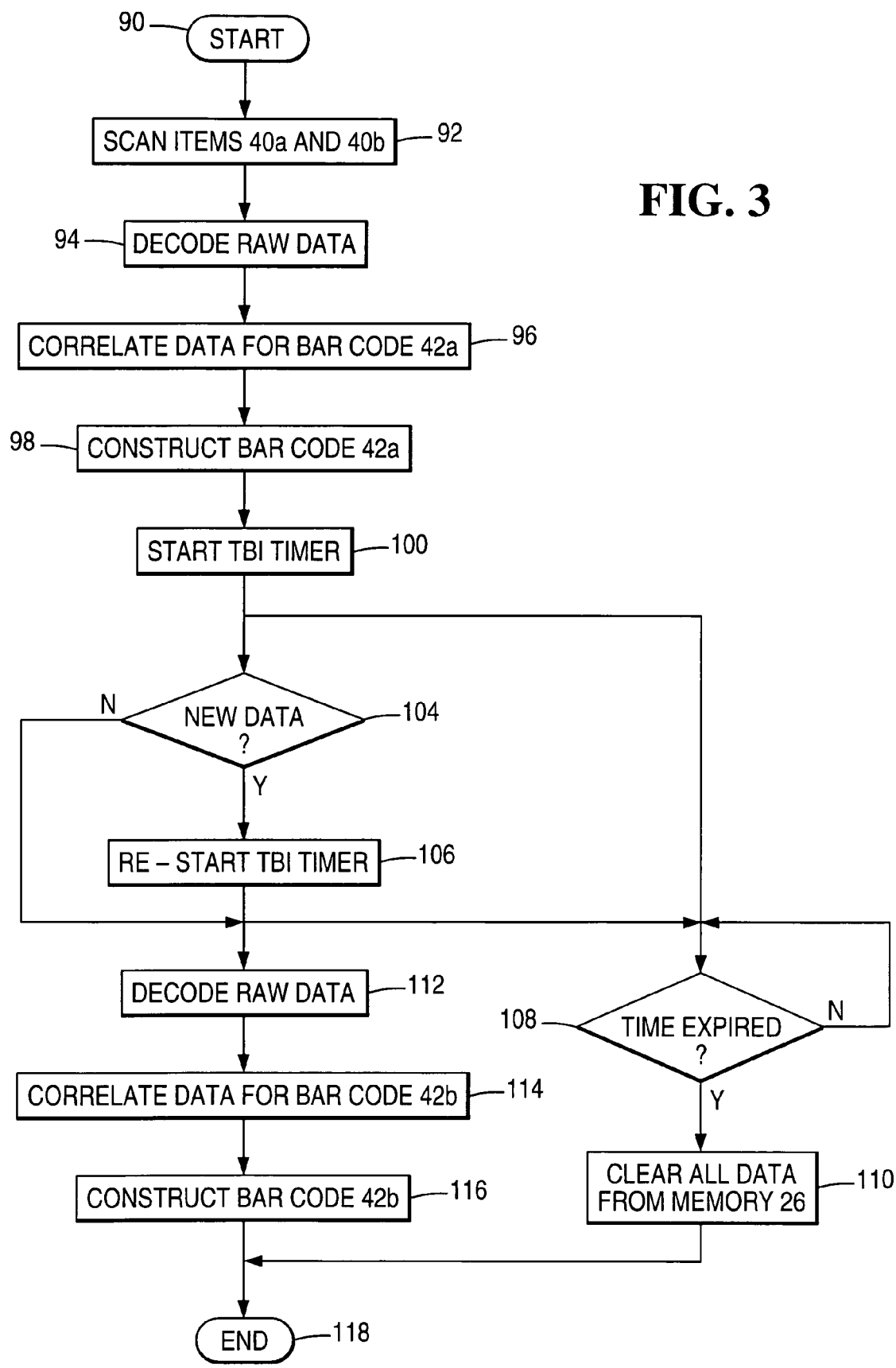
FIG. 3 is a flow diagram illustrating a second method of reading more than one bar code.

With reference to FIG. 3, a second embodiment uses a serial process by building one bar code and then attempting to build a second bar code, beginning with Start 90.

In step 92, two items 40*a* and 40*b* are placed within scan volume 44. Placement is substantially simultaneous, within scan volume 44, as opposed to conventionally placing one item at a time within scan volume 44.

In step 94, decoding and control circuitry 28 decodes raw data provided by detector 20.

In step 96, decoding and control circuitry 28 correlates data for bar code 42*a*.

In step 98, decoding and control circuitry 28 constructs bar code 42*a*, being careful to check for linkage.

In step 100, decoding and control circuitry 28 starts a time between items (TBI) timer. Operation branches to steps 104 and 108.

In step 104, decoding and control circuitry 28 determines whether new data from a re-scan of items 40*a* and 40*b* is present. If not, operation proceeds to step 112. If so, operation proceeds to step 106.

In step 106, decoding and control circuitry 28 restarts the TBI timer. Operation branches to steps 108 and 112.

In step 108, decoding and control circuitry 28 continually monitors the TBI timer to see if the TBI time period has expired. The TBI timer is used as a lockout timer to prevent the scan of the same item, i.e., to prevent double-reads. This method compromises checker productivity by using a TBI time period long enough to give the checker as much time as possible to perform a re-scan of both items 40*a* and 40*b*, should bar code 42*b* fail to scan.

The TBI timer is programmable and is usually set to 450 or 600 ms for normal use. For the two bar code operation described in this embodiment, the TBI timer is set to 1200 ms. A longer time period is necessary to give the checker time to bring both items back into scan volume 44.

If the TBI time period expires before decoding and control circuitry 28 can complete re-scan and reset (steps 104 and 106), or if the TBI time period expires before decoding and control circuitry 28 can construct bar code label 42*b* (steps 112–116 below), operation proceeds to step 110.

In step 110, decoding and control circuitry 28 clears all data from memory 26 to prepare for scanning of other items. Operation ends at step 118.

In step 112, decoding and control circuitry 28 attempts to decode raw data associated with bar code 42*b*. During this step, decoding and control circuitry 28 filters out data from bar code 42*a*.

In step 114, decoding and control circuitry 28 correlates data for bar code 40*b*.

In step 116, decoding and control circuitry 28 constructs bar code 42*b*, being careful to check for linkage.

In step 118, operation ends.

The method of FIG. 3 is less desirable than the method of FIG. 2. Since bar code data from bar code 42*b* may be thrown out, the probability of bar code 42*b* being decoded on the first scan is less than one hundred percent. Also, the method of the second embodiment is not suited for simultaneously scanning like items. Using a parallel solution as illustrated in FIG. 2 improves the chances of bar code 42*b* being decoded on the first scan and facilitates simultaneous scanning of like items.

Although the invention has been described with particular reference to certain preferred embodiments thereof, variations and modifications of the present invention can be effected within the spirit and scope of the following claims.

What is claimed is:

1. A method of reading a plurality of bar codes from two or more items moved substantially simultaneously through a scan volume of a bar code scanner comprising the steps of:
    a) obtaining data for the plurality of bar codes from a detector in the bar code scanner as said items move through the scan volume;
    b) determining position information associated with the data;
    c) distinguishing data associated with each bar code using the position information;

d) assembling the plurality of bar codes from the data and determining the number of bar codes successfully read;
e) storing the position information in a memory;
f) formatting only the bar codes that are unreadable into a format usable by a computer;
g) repeating steps a) through d) during a rescan of the bar codes; and
h) determining that the re-scan has occurred by comparing newly acquired position information with stored position information.

2. The method of claim 1, further comprising the step of:
providing a single good read indication after all of the bar codes are readable.

3. The method of claim 1, further comprising the step of:
providing a good read indication after each readable bar code.

4. The method of claim 1, wherein step d) comprises the steps of:
   d-1) assigning object identifiers to each piece of the data; and
   d-2) applying correlation routines for separating the data into groups, for constructing the bar codes from the data in the groups, and for testing constructed bar codes for validity.

5. A method of reading a plurality of bar codes from two or more items moved substantially simultaneously through a scan volume of a bar code scanner comprising the steps of:
   a) obtaining data for the plurality of bar codes from a detector in the bar code scanner as said items move through the scan volume;
   b) determining position information associated with the data;
   c) distinguishing data associated with each bar code using the position information; and
   d) assembling the plurality of bar codes serially from the data and determining the number of bar codes successfully read, wherein step d) further comprises the steps of:
      d-1) correlating first data for a first bar code on a first item;
      d-2) constructing the first bar code from the first data;
      d-3) correlating second data for a second bar code on a second item;
      d-4) constructing the second bar code from the second data;
      d-5) starting a timer to time a time period; and
      d-6) clearing a memory in the bar code scanner if the time period expires.

6. The method of claim 5, wherein the time period is short enough to prevent scanning of the second item if the second item is like the first item, but long enough to allow a checker to rescan the first and second items should the scanner fail to read the second bar code.

7. A method of reading a plurality of bar codes during a scanning motion across a bar code scanner comprising the steps of:
   a) obtaining data from a detector in the bar code scanner during the scanning motion;
   b) determining that pieces of the data are part of the bar codes;
   c) determining position information associated with each of the pieces of the data;
   d) assigning object identifiers to the pieces of the data based upon the position information;
   e) separating the pieces of the data into groups corresponding to the object identifiers;
   f) constructing the bar codes in parallel, including combining the pieces of data in each group;
   g) formatting the bar codes into a format usable by a computer; and
   h) storing the position information in a memory;
   i) repeating steps a) through e) during a rescan of the bar codes;
   j) determining that the re-scan has occurred by comparing newly acquired position information with stored position information; and
   k) formatting only bar codes that were unreadable into the format usable by the computer.

8. The method of claim 7, further comprising the step of:
   1) providing a single good read indication after all of the bar codes are readable.

9. A scanning method comprising the steps of:
   a) obtaining data from a detector in a bar code scanner following simultaneous movement of a plurality of items bearing a plurality of bar codes across the bar code scanner;
   b) determining position information associated with the data;
   c) separating the pieces of data into groups corresponding to the bar codes using the position information, wherein step c) comprises the steps of:
      c-1) assigning a time and a location to each of the pieces of the data;
      c-2) computing trajectories from the times and the locations of the pieces of the data;
      c-3) separating the pieces of the data according to the trajectories the pieces are in; and
   d) constructing the bar codes, including combining the pieces of data in each group.

10. The method of claim 9, wherein the bar codes are alike.

11. The method of claim 9, wherein the bar codes are different.

* * * * *